United States Patent Office 2,907,610
Patented Oct. 6, 1959

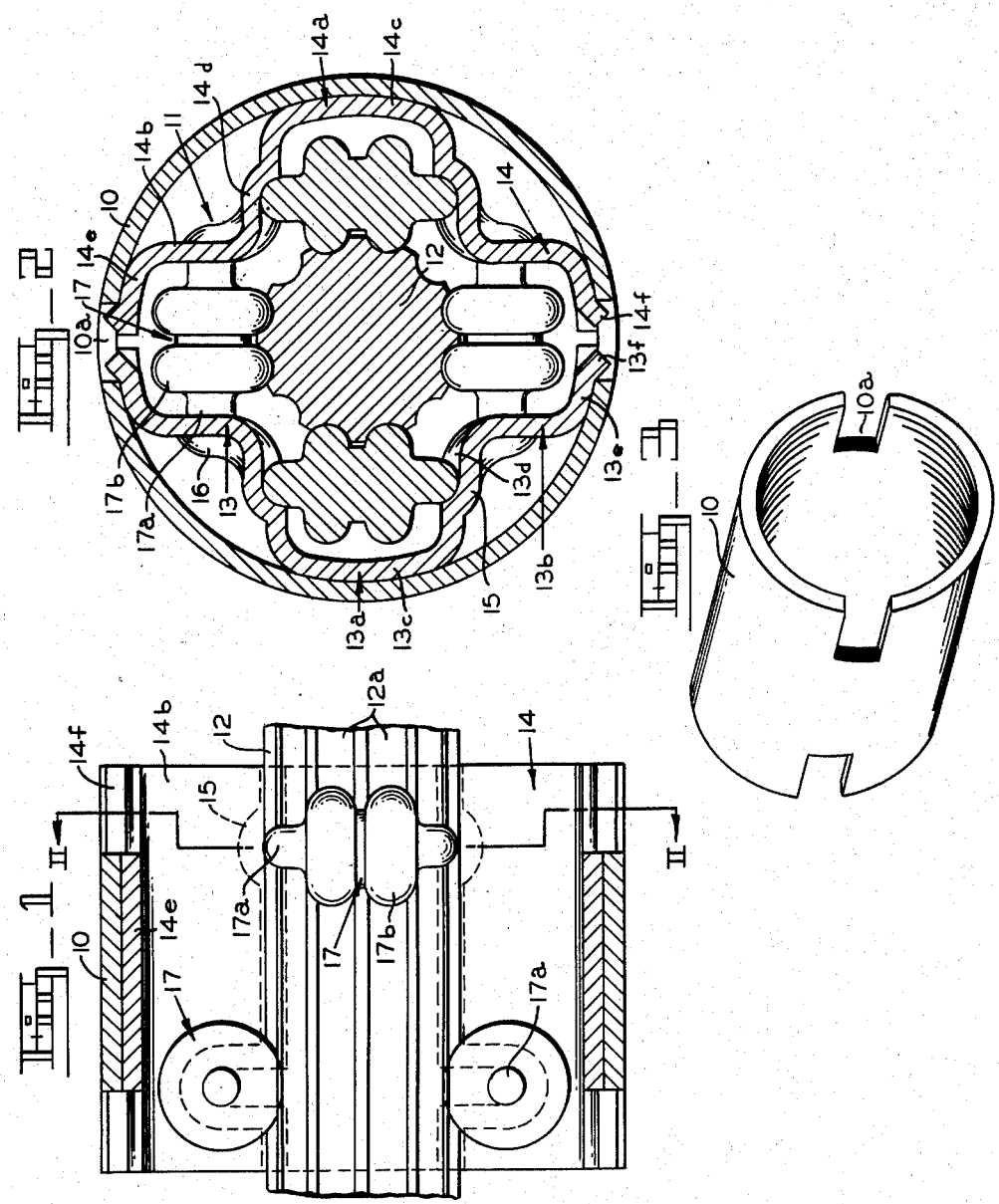

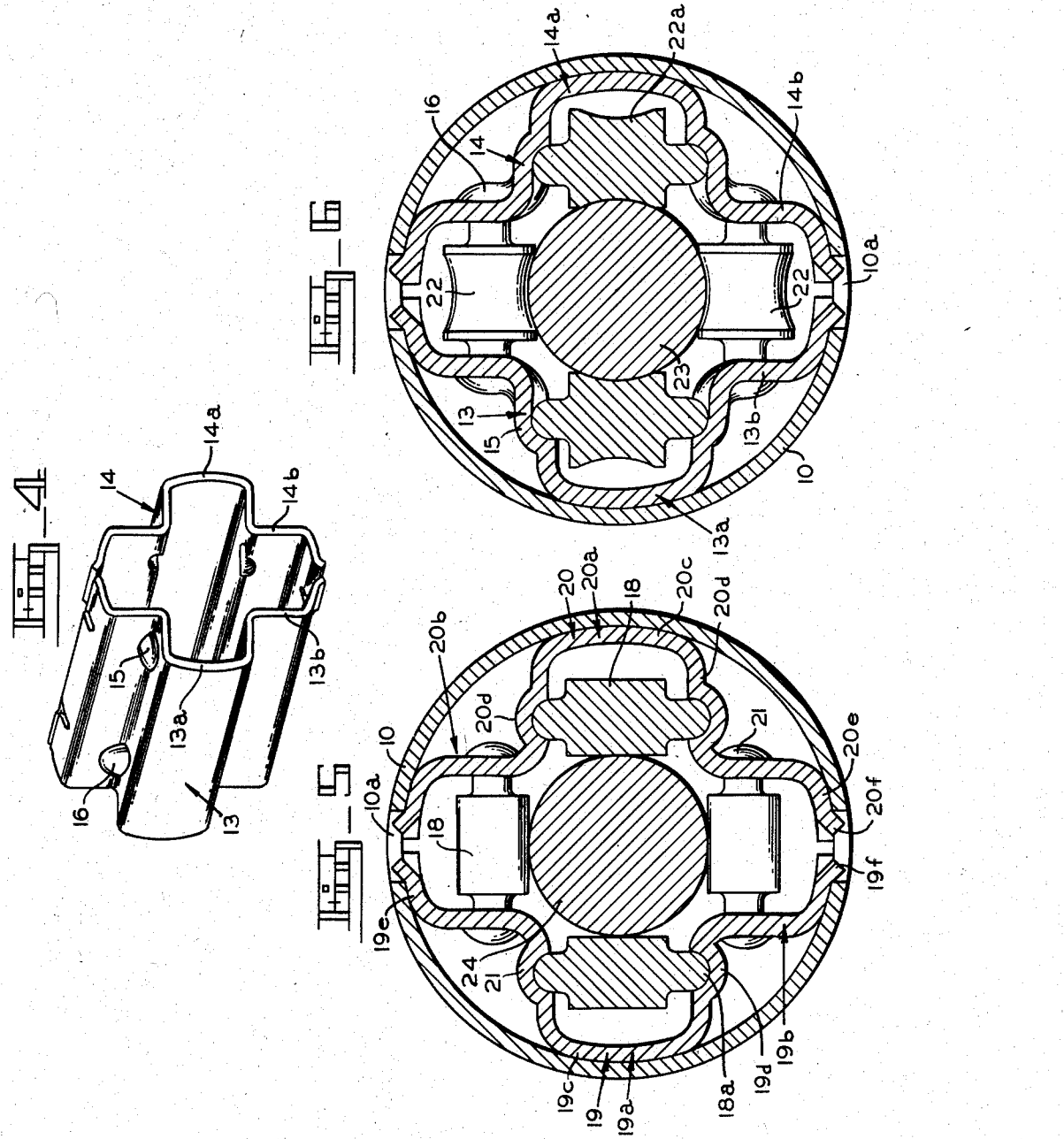

2,907,610

BEARING STRUCTURE

Ralph H. Wise, Gary, Ind., assignor, by mesne assignments, to The Anderson Company, a corporation of Indiana Application February 1, 1956, Serial No. 562,806

13 Claims. (Cl. 308—6)

The present invention relates to antifriction or bearing means and, more particularly, to an improved bearing structure for accommodating relative longitudinal movement between two telescoping members.

In many industrial applications it is necessary to pass a rod, shaft, bar, or the like, through a support therefor to perform some desired mechanical function. Common examples of such applications include indexing operations where a load is carried axially along a shaft, the reciprocating longitudinal movements of rods and shafts in printing presses, the movement of bar supports for drawers in cabinets, and the like.

The present invention provides antifriction or bearing means of improved and simplified structure for these and other applications. My bearing means is easy to make from inexpensive materials and eliminates the need for certain mechanical operations in its manufacture, such as the grinding of a race member. Yet the present bearing structure readily provides relative longitudinal movement between two telescoping members at low friction. If desired, the bearing means can also be adapted to prevent relative rotary movement between the two members when in relative longitudinal motion. In this manner, the members may be periodically rotated or reset with respect to each other to distribute uniformly the wear on the member having a rolling frictional contact with the antifriction means.

In one form, my bearing means may comprise a tubular casing through which a rod, shaft, bar, or like member passes. Retaining means is interposed between the casing and shaft and fixed relative to the casing. Elongate bearing elements journaled in the retaining means and disposed transversely of the casing and shaft make a low frictional contact with the shaft as it moves longitudinally through the casing. To prevent relative rotation between the casing and shaft, the latter may have axially extending grooves, and the bearing elements may have radially enlarged portions which ride in the grooves.

The accompanying drawings illustrate a presently preferred embodiment wherein:

Figure 1 is a longitudinal view of a bearing structure embodying the present invention in which part of the casing and race means have been removed for purposes of illustration;

Figure 2 is an offset section of Figure 1 on the line II—II;

Figures 3 and 4 are perspective views of the casing and race means, respectively, of Figures 1 and 2; and Figures 5 and 6 are sectional views similar to that of Figure 2 and illustrate modifications.

Referring to the drawings, the embodiment of Figures 1 through 4 includes an outer tubular casing 10 having opposed slots or notches 10a at each end. Antifriction means generally indicated at 11 guides a shaft 12 having axially extending grooves 12a for relative longitudinal movement with respect to the casing 10. Normally, the casing is stationary and held in place by suitable fasteners or clamps, not shown, and the shaft 12 is the actually moving member, but the reverse is possible as well.

The antifriction means 11 includes a pair of opposed holders or cages 13 and 14, preferably made of spring steel, which together define a race means or retainer as illustrated in Figure 2. The structure of each of the holders 13 and 14 may be the same, and therefore a description of unit 13 can suffice for both, corresponding parts having the same letter suffix. Unit 13 is bowed outwardly at a medial part to form substantially a U-shaped section 13a and terminates in end sections 13b. The base or most outward part of the U-shaped section 13c preferably abuts against the casing 10 to impart rigidly to the structure, and the sides or legs 13d substantially parallel the direction of movement of the shaft 12. Thus, the units 13 and 14 together form a race means or retainer which has a fluted or undulating form in a circumferential direction. Adjacent one end of the unit 13, the sides or legs 13d of the U-shaped section are recessed or upset as at 15 to form opposed pockets for journaling bearing elements as hereinafter described. Adjacent the other end of the unit 13 (Figure 4), the end sections 13b are recessed or upset as at 16 also for journaling bearing elements. The end sections 13b have ledges or lips 13e which in turn are provided with outwardly directed tabs, detents, or lugs 13f at each side. The tabs engage the slots 10a of the casing (Figure 2).

The present bearing means is designed for bearing elements having a greater length than width. Bearing elements of this shape are preferred to those of small size such as ball bearings or similar bearings of spherical shape. Bearings of the type first mentioned are easier to handle, as when assembling the bearing unit, and are more readily manufactured and less likely to be lost. Yet such bearing elements provide an effective, low frictional operation, since the elements still have a small contact area with the inner telescoping member and particularly one of arcuate cross section.

For example, elongate bearing elements 17 (Figure 2) may be used. These elements are preferably tempered and have ends of reduced diameter to form pintles or trunnions 17a which are journaled in the legs 13d and in the end sections 13b and, more particularly, in the recesses 15 and 16 thereof. In the preferred form, the bearing elements 17 have radially enlarged bearing surfaces 17b substantially of toroidal shape. The curved periphery of a bearing surface 17b makes substantially a line contact with an inner telescoping member of relatively flat sides, such as a bar of square cross section. These enlarged bearing surfaces 17b provide another advantage where relative rotation between the casing and shaft is undesirable. In this case, a shaft or other member having axially extending grooves is used, such as the shaft 12. The bearing surfaces 17b ride in the grooves 12a to prevent the unwanted relative rotation between the casing 10 and shaft 12. Yet the shaft 12 may be reset in a rotary direction with respect to the casing 10 to distribute wear on the shaft as hereinafter noted.

Instead of the bearing elements 17, cylindrical bearing elements of uniform diameter 18 may be used as shown in Figure 5. In this case a shaft 24 without grooves is ordinarily employed. Figure 5 illustrates another modification. The bearing elements 18 may be self-contained by dimpling the plates 19 and 20 to form sockets 21 which receive the shaft portions or pintles 18a of the bearing elements.

The shape of the bearing elements is not critical, since they may be variously formed to fit the configuration of the inner member of the two telescoping parts or to engage the inner member at spaced-apart points in the manner of elements 17. Where an increased area of frictional contact is not undesirable, the bearing elements may be shaped to fit the inner telescoping member. For example, bearing elements 22 of Figure 6 may be used on a shaft 23 of circular cross section. Elements 22 have a bearing surface of concave curvature 22a in an axial or longitudinal direction for close-fitting rolling engagement with the arcuate surface of shaft 23.

The bearing unit of the present invention may be easily assembled. The embodiments of Figures 2 and 6 are assembled in the same manner. Referring to the former, the end sections 13b and 14b of the units 13 and 14 are compressed radially inwardly until the tabs 13f and 14f at one end clear the end of the casing 10. Each unit is then slid in turn into position within the casing and released, after which the inwardly compressed ends of the units expand radially outwardly to insert the tabs 13f or 14f into the slots 10a. The units 13 and 14 are thereby locked against relative longitudinal and rotary movement with respect to the casing 10. The casing and unit are next turned so as to dispose either the recesses 15 or 16 in a vertical direction. Two of the bearing elements 17 are placed in the recesses so disposed, and the shaft 12 then inserted between the bearing elements and stopped short of the remaining recesses to hold the inserted bearing elements in place. The casing and shaft are then rotated ninety degrees to dispose the remaining recesses vertically. Two additional bearing elements 17 are then deposited in these recesses and the shaft 12 is now passed entirely through the casing 10. Thereafter, the bearing elements are always maintained in position by the shaft.

In the embodiment of Figure 5, the end sections 19b and 20b of the units are spread apart so that a bearing element 18 may be pushed into position between the legs or sides 19d and 20d of the U-shaped sections and make a snap fit within the sockets 21. Two additional bearing elements are next fitted in the sockets 21 of the end sections 19b and 20b and the units held facing one another as in Figure 5. The lugs or detents 19f and 20f at one end are next compressed radially inwardly and the units and bearing elements are inserted en masse into the casing 10, after which the compressed lugs are released to enable them to engage the notches 10a as before. The nature of the spring steel from which the units 13, 14, 19, and 20 are made enables the units to be resiliently deformed to permit the described assemblies.

As previously noted, relative movement between the casing 10 and shaft 12 of Figure 2 is prevented by the engagement of the radially enlarged bearing surfaces 17b in the grooves 12a of the shaft. By entirely removing the shaft 12 from the casing 10 and rotating the shaft with respect to the casing and then reassembling the parts as described, the wear on shaft 12, which usually is not tempered or otherwise treated, may be uniformly distributed. The number of grooves 12a may exceed the number of enlarged bearing surfaces 17b as indicated in Figure 2, so that the angular adjustment of the shaft 12 may be very small, further to distribute the wear more evenly about the shaft.

It will be noted that the present bearing structure is easy to fabricate from inexpensive materials. The units of the annular race means or retainer 11 may be made in two stampings. Further, each unit is the same, thereby eliminating any right-hand and left-hand member. Further, the race means need not be ground or otherwise treated to receive the bearing elements.

Although the foregoing disclosure describes a presently preferred embodiment and modifications thereof, it is understood that the invention may be practiced in still other forms within the scope of the following claims.

I claim:

1. A bearing to receive a shaft or the like for relative longitudinal movement therein including an outer casing having openings therein, race means stationed within the casing and comprising opposed holders, each holder being bowed outwardly at a medial part to form opposed surfaces and terminating in end portions, each end portion having tab means for entry in an opening of the casing to prevent relative longitudinal movement between the casing and holder, an elongate bearing element disposed transversely of the casing and journaled for rotation about a longitudinal axis thereof in said opposed surfaces of each holder, and an additional elongate bearing element disposed transversely of the casing and journaled for rotation about a longitudinal axis thereof across the adjacent end portions of the holders.

2. A bearing as claimed in claim 1 wherein the bearing elements journaled in the opposed surfaces of the plates are adjacent one end of the casing and the bearing elements journaled across the end portions of the plates are adjacent the other end of the casing.

3. A bearing to receive a shaft or the like for relative longitudinal movement therebetween including an outer casing having opposed slots at each end, race means stationed within the casing and comprising a pair of opposed holders, each holder being bowed outwardly at a medial part to form a substantially U-shaped area and terminating in end portions, the base of each U-shaped area butting against the casing and the sides of each U-shaped area forming opposed surfaces, said end portions and said opposed surfaces having recesses, an outwardly directed tab on each side of each terminating end portion to engage the slots of the casing and prevent relative longitudinal movement between the casing and holders, an elongate bearing element disposed transversely of the casing and having end portions of reduced diameter to engage rotatably the recesses in said opposed surfaces of each U-shaped area, and an additional elongate bearing element disposed transversely of the casing and having end portions of reduced diameter to engage rotatably the recesses of the adjacent end portions of the holders, said bearing elements making a rolling engagement with the shaft upon relative longitudinal movement between the casing and shaft.

4. Bearing means for a reciprocating shaft, comprising a tubular casing coaxially of and receiving said shaft, a plurality of identical complementary resilient sheet metal holder units stationed in and extending lengthwise of said casing, each holder being formed centrally thereof with a channel of generally U-shape cross section extending lengthwise of said casing with its channel facing the channel of its complementary unit, the walls defining said channel being formed with opposed pockets to receive bearing elements, the side walls of said channel merging into portions extending sharply away from said channel, and each of said portions terminating in a ledge generally paralleling the side walls of the channel and abutting the wall of said casing, and antifriction elements received in each of said opposed pockets.

5. The combination as claimed in claim 4 wherein the shaft is formed with one or more grooves extending lengthwise thereof, and one or more of said antifriction elements has an enlarged circumferential portion cooperating with said groove.

6. Bearing means for an elongate reciprocable member comprising a tubular casing to be fixedly mounted coaxially of and to receive said reciprocable member, race means stationed within the casing and comprising a plurality of elongate spring metal units, said units being shaped to provide channels extending lengthwise of the casing with the channels facing toward the center thereof, there being opposed bearing sockets formed in the side walls of each channel, elongate bearing elements each having a pintle on either end journaled in said sockets, at least two of said bearing elements being spaced substantially diametrically opposite each other in close proximity to one axial end of the race means, and at least two additional bearing elements being spaced substantially diametrically opposite each other in close proximity to the other axial end of said race means.

7. The apparatus as defined in claim 6 wherein the last two bearing elements are disposed transverse to the first-mentioned bearing elements.

8. The bearing means as defined in claim 6 wherein each end of each unit is formed with releasable means biased to engage a notch in an end portion of said casing, for restraining the units against lengthwise or rotary movement.

9. Bearing means as claimed in claim 8 wherein said means to prevent lengthwise movement between the casing and the units includes yieldably sustained lugs on the ends of each unit and the casing has openings to releasably receive the lugs.

10. A race comprising two oppositely formed complementary units designed to embrace a shaft or the like, and the race to be mounted in a cylindrical casing, each unit being formed of yieldable material with a central channel portion to parallel the shaft, the channel merging into portions extending away and in a common plane from either side of the channel and each portion terminating in an abutment engageable with the casing, said portions of the one unit being arranged opposite the corresponding portions of the other unit, and the channel of one unit facing the channel of the complemental unit, opposed bearing pockets formed in each channel, and antifriction elements mounted in said pockets.

11. Bearing means for a reciprocable member comprising a tubular casing to be fixedly mounted coaxial of and to receive said member, race means stationed within said casing and comprising an assemblage of identical complementally arranged elongate spring metal units, each unit being shaped to provide a U-shaped channel extending lengthwise the casing with the channels facing inwardly of the casing, there being opposed bearing sockets formed in the side walls of each channel and the side walls of each channel merging into casing-engaging end sections, extending generally at right angles to the channel, said sections lying in substantially the same plane, bearing elements disposed between said sockets and reacting with the units to urge said sections against said casing.

12. Bearing means for a reciprocating shaft or the like comprising a tubular casing to receive said shaft, a plurality of complementary resilient sheet metal holder units stationed in and extending lengthwise of said casing, each unit being formed centrally thereof with a channel extending lengthwise of said casing and facing inwardly, the walls defining said channel being formed with opposed pockets to receive bearing elements, the side walls of said channels merging into portions extending sharply away from said channel and each portion terminating in a ledge generally paralleling the side walls of the channel and abutting the wall of said casing, each of said portions being formed with one or more bearing pockets mating those of an opposed complementary unit, antifriction elements between said pockets and maintaining said portions apart and against said casing.

13. In bearing means for two telescoping members adapted for relative longitudinal movement, a retainer ring comprised of a plurality of identical, independent complemental sheet metal sections interposed between the members and having an undulated form in a circumferential direction, the contiguous portions of the sections abutting the outer one of the two telescoping members and the portion of the sections intermediate said contiguous portions defining opposed surfaces, said surfaces being formed with mating sockets and elongated bearing elements journaled in the sockets of said surfaces, said elements being stationed transversely of the telescoping members and on the inner side of the retainer ring for rolling engagement with the inner member.

References Cited in the file of this patent

UNITED STATES PATENTS

| 531,723 | Hill | Jan. 1, 1895 |
| 2,353,088 | Schutz | July 4, 1944 |
| 2,691,397 | Klingens | Oct. 12, 1954 |

FOREIGN PATENTS

| 1,031,490 | France | Mar. 18, 1953 |